(12) United States Patent
Shen et al.

(10) Patent No.: US 9,674,286 B2
(45) Date of Patent: Jun. 6, 2017

(54) COLLABORATION SYSTEM AND METHOD

(75) Inventors: Francis Shen, Concord (CA); Paulo Francisco, Concord (CA)

(73) Assignee: Mitel Networks Corporation, Ottawa (CA)

(*) Notice: Subject to any disclaimer, the term of this patent is extended or adjusted under 35 U.S.C. 154(b) by 1192 days.

(21) Appl. No.: 13/358,236

(22) Filed: Jan. 25, 2012

(65) Prior Publication Data
US 2012/0191781 A1 Jul. 26, 2012
US 2014/0012903 A2 Jan. 9, 2014

Related U.S. Application Data

(60) Provisional application No. 61/435,941, filed on Jan. 25, 2011.

(51) Int. Cl.
G06F 15/16 (2006.01)
H04L 29/08 (2006.01)
G06Q 10/10 (2012.01)
H04L 12/18 (2006.01)
H04L 29/06 (2006.01)

(52) U.S. Cl.
CPC ........... H04L 67/16 (2013.01); G06Q 10/10 (2013.01); H04L 12/1822 (2013.01); H04L 65/1089 (2013.01); H04L 65/403 (2013.01); H04L 65/4015 (2013.01)

(58) Field of Classification Search
CPC . G06Q 10/10; H04L 12/1822; H04L 64/4015; H04L 65/403; H04L 65/1089; H04L 67/16
USPC ........................................................ 709/204
See application file for complete search history.

(56) References Cited

U.S. PATENT DOCUMENTS

| | | | |
|---|---|---|---|
| 6,583,806 B2 | 6/2003 | Ludwig et al. | |
| 7,185,054 B1 | 2/2007 | Ludwig et al. | |
| 2002/0087883 A1 | 7/2002 | Wohlgemuth | |
| 2003/0037111 A1 | 2/2003 | Yoshioka | |
| 2004/0177359 A1 | 9/2004 | Bauch | |
| 2005/0267972 A1* | 12/2005 | Costa-Requena et al. ... | 709/227 |
| 2006/0050688 A1* | 3/2006 | Panagopoulos ......... | H04L 12/66 370/356 |
| 2006/0161651 A1 | 7/2006 | Ardulov et al. | |
| 2006/0236247 A1 | 10/2006 | Morita et al. | |

(Continued)

FOREIGN PATENT DOCUMENTS

WO 2008/043182 4/2008
WO 2011/153623 12/2011

OTHER PUBLICATIONS

Anonymous: "Automatic server discovery", Oct. 17, 2010, XP055139409, Retrieved from the Internet: URL:http://en.wikipedia.org/w/index.php? title=Automatic_server_discovery &oldid.

(Continued)

*Primary Examiner* — Joseph Greene

(57) ABSTRACT

A participant computing device in a collaboration system, the participant computing device comprising a processing structure; and a memory including computer program code, wherein the memory and the computer program code are configured, with the processing structure, to cause the processing structure to share user defined content displayed on a desktop associated with the participant computing device with other participant computing devices.

22 Claims, 3 Drawing Sheets

(56) References Cited

U.S. PATENT DOCUMENTS

2007/0185959 A1* 8/2007 Huck et al. .................. 709/204
2009/0019367 A1 1/2009 Cavagnari et al.

OTHER PUBLICATIONS

PCT International Search Report PCT/CA2012/000073. Mailed Apr. 18, 2012.

* cited by examiner

COLLABORATION SYSTEM AND METHOD

BACKGROUND OF THE INVENTION

Field of the Invention

The present invention relates to collaboration systems and methods.

Description of the Related Art

Collaboration systems are well known. The process of setting up a computing device to participate in a collaboration system, such as a video conference, is often time consuming and frustrating to the average user. Typically, a video cable is used to connect the video source to a video conferencing encoder. This requires that the user have sufficient knowledge and motivation to configure their laptop or personal computer for a dual monitor display scenario, and/or connect the laptop or personal computer to the collaboration system resources, such as a projector or video encoder, using specialized video cables. In addition, the software and user interfaces in such solutions tend to be involved, non-intuitive, and require multiple steps to achieve the desired goal.

Another problem inherent in existing collaboration systems is the inability to easily share desktop content rendered on a display screen. Generally, sharing images of the desktop, or a portion thereof, involves a screen capture using multiple commands or multiple keys, pasting the captured content onto a clipboard, saving the clipboard content, launching a messaging client, such as an email application program, attaching the clipboard contents to a message, selecting a destination, and finally sending the message.

It is an object of the present invention to mitigate or obviate at least one of the above-mentioned disadvantages.

SUMMARY OF THE INVENTION

In one of its aspects there is provided, in a collaboration system, a method for sharing content displayed on a desktop associated with a participant computing device, the participant computing device having a processing structure; and a memory including instructions, wherein the memory and the instructions are configured, with the processing structure, to cause the processing structure to at least:
automatically discover a network server configured to distribute the content to other participant computing devices; couple the participant computing device to the network server; select said content on the desktop for sharing; capture the content; and automatically send the captured content to at least one of the other participant computing devices.

In another of its aspects there is provided a participant computing device having a machine-readable medium comprising coded instructions executable by a processing structure, the coded instructions comprising: (a) a first set of instructions coded to determine the availability of at least one video application server in a collaboration system, the first set of instructions coded to discover a network address of the at least one video application server; (b) a second set of instructions coded to couple the participant computing device to the at least one video application server; and (c) a third set of instructions coded to select content on a display of the participant computing device for sharing with other participant computing devices via the at least one video application server; whereby the selected content is captured for the sharing.

In yet another of its aspects there is provided a participant computing device in a collaboration system, the participant computing device comprising: a processing structure; and a memory including computer program code, wherein the memory and the computer program code are configured, with the processing structure, to cause the processing structure to share user defined content displayed on a desktop associated with the participant computing device with other participant computing devices.

In another of its aspects there is provided a simplified method for setting up a computing device for operation in a collaboration system, in which the computing device only needs to establish a connection with a video application server via a network protocol, such as IP, and the computing device is associated with the appropriate collaboration system resources.

Advantageously, desktop content may be shared easily among participants using simplified steps.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
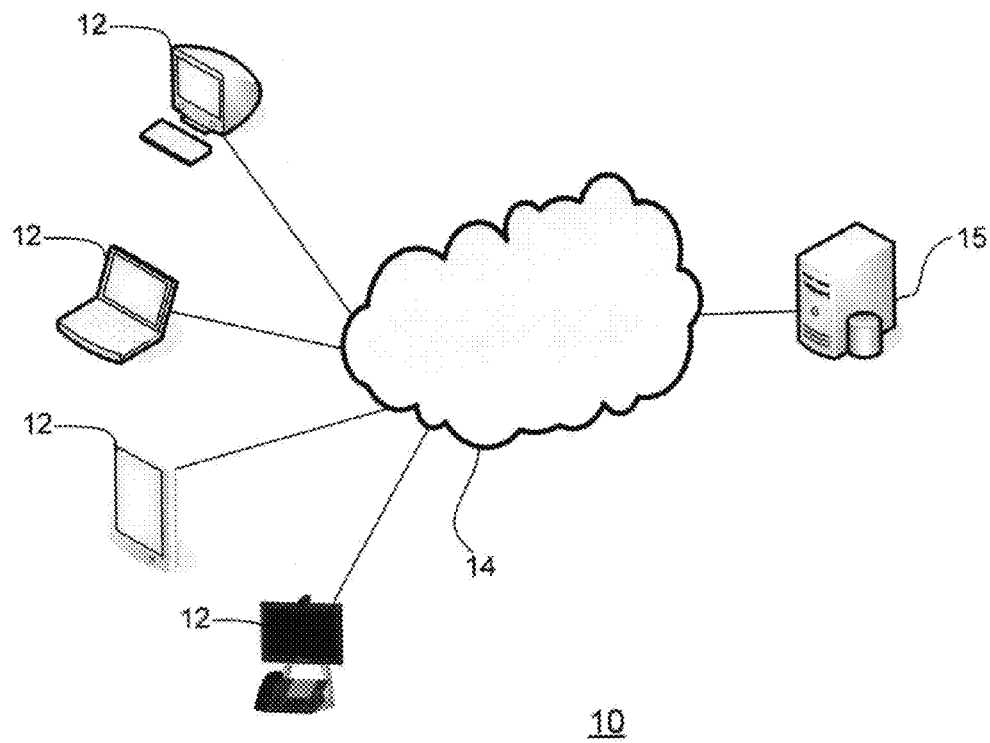
FIG. 1 shows an exemplary collaboration system.

Many of the methods of the invention may be performed with a digital processing system, such as a conventional, general purpose computer system. Special purpose computers which are designed or programmed to perform only one function may also be used. FIG. 1 shows an exemplary collaboration system, generally identified by reference numeral 10, comprising a plurality of participant computing devices 12 in communication with each other by either wired or wireless connection via a network 14, including a video application server (VAS) 15 to facilitate content sharing among the devices 12. In this exemplary embodiment, the network 14 is an intranet within an organization; however the network 14 may alternatively be another network, such as for example, a cellular network, the Internet, or a mixture of different networks.

Figure 2:
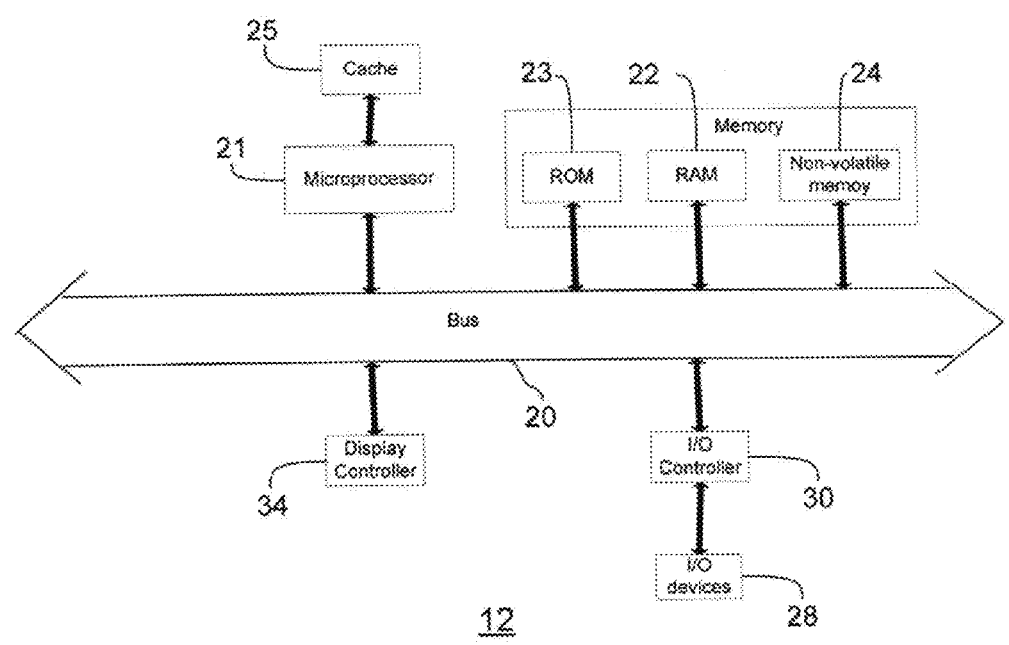
FIG. 2 shows a schematic diagram of an exemplary participant computing device.

FIG. 2 shows one example of a typical computer system of participant device 12 within the collaboration system 10. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computing system may be in the form of any kind of general processing structure, and may for example include any computing device 12 participating in the collaboration session, such as, personal computers, laptops, tablets, computer servers, computerized kiosks, personal digital assistants (PDAs), cellular phones, smartphones and videophones. Each device 12 includes a software client module stored in the memory, and having a plurality of program instructions executable by the microprocessor 21, such as a desktop sharing application or a configuration program. The VAS 15 comprises similar computing system, however, it may further comprise data structures, such as, databases. The VAS 15 acts as a mediator for collaboration communications between authenticated users on devices 12.

As shown in FIG. 2, the computer system, which is a form of a data processing system, includes a bus 20 which is coupled to a microprocessor 21 and a read only memory (ROM) 22 and volatile random access memory (RAM) 23 and a non-volatile memory 24. The microprocessor 21 is coupled to cache memory 25. The bus 20 interconnects these various components together and also interconnects these components 21, 22, 23, and 24 to a display controller 34 and to peripheral devices such as input/output (I/O) devices 28 which may be mice, keyboards, modems, network interfaces, printers, scanners, video cameras and other devices which are well known in the art. Typically, the input/output devices are coupled to the system through input/output controllers 30. The bus 20 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as a machine readable medium, or ROM 22, volatile RAM 23, non-volatile memory 24, cache 25 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 21. The machine readable medium includes any mechanism that provides (i.e., stores and/or transmits) information in a form accessible by a machine (e.g., a computer, network device, personal digital assistant, any device with a set of one or more processors, etc.). For example, machine readable media includes recordable/non-recordable media (e.g., ROM; RAM; magnetic disk storage media; optical storage media; flash memory devices; etc.), as well as electrical, optical, acoustical or other forms of propagated signals (e.g., carrier waves, infrared signals, digital signals, etc.).

Figure 3:
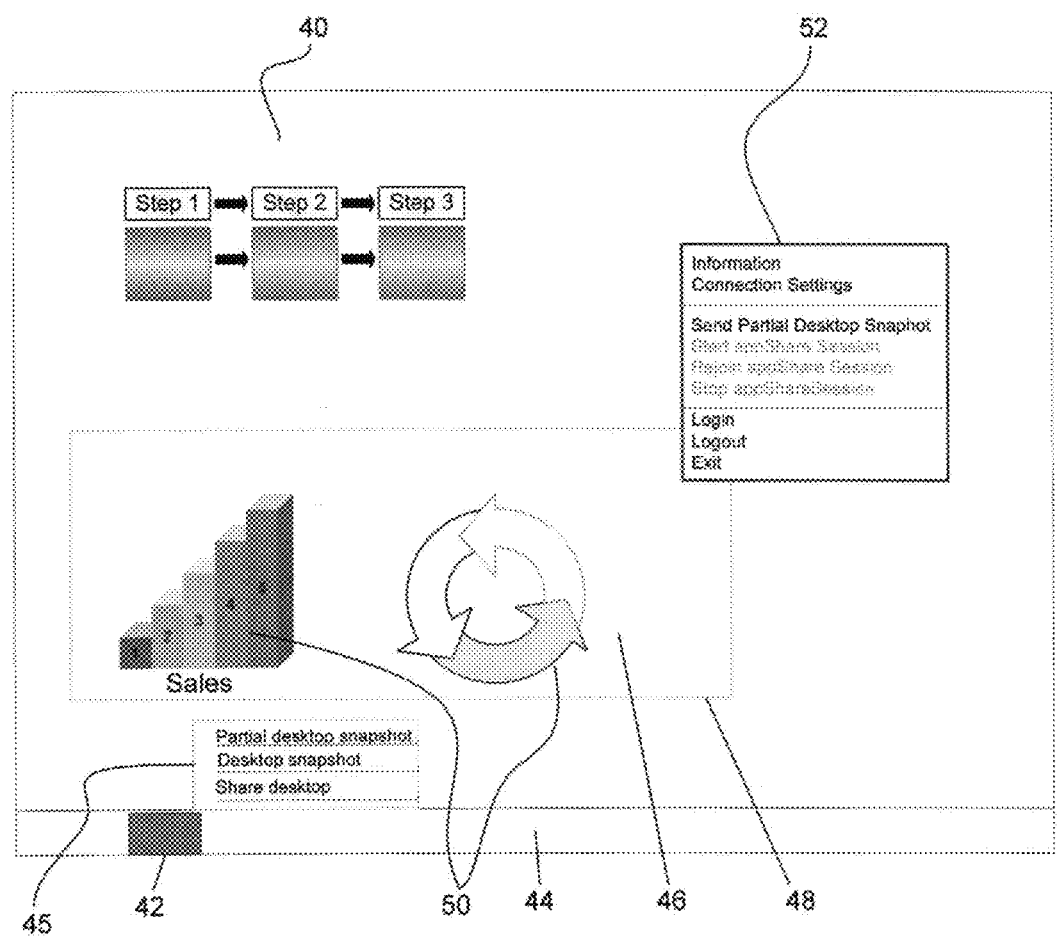
FIG. 3 shows an exemplary desktop with shared content.

Turning to FIG. 3, each of the participant computing devices 12 comprises a graphical user interface (GUI), such as display screen 40 on which information is displayed. The GUI includes, but is not limited to, the "desktop" of the operating system, controls such as taskbars and scroll bars, any icons and application windows. Thus, the GUI allows information to be presented on devices 12 in windows. Each device 12 runs a desktop sharing application program that permits the devices 12 to share the displayed information on the GUI. The collaboration system 10 includes real-time audio and/or video teleconferencing, and data conferencing. More specifically, data conferencing includes desktop sharing, that is, sharing of "snapshots" of selected regions of the display screen 40, and application sharing, that is, shared control of running applications, shared whiteboard and annotation capabilities.

In operation, after the device 12 is first powered on and coupled to the network 14 via a network interface, a configuration process is initiated by the software client module on device 12 in order to configure the device 12 for participation in the collaboration system 10. The software client module comprises an application program that is executed to connect the device 12 to the collaboration system 10, via a VAS 15. In one example, the application program prompts a participant to enter the network address of the VAS 15, such as an IP address, and the application program automatically determines whether the identified VAS 15 is reachable from the device 12. This determination may be implemented via a ping command, as is well known in the art, or by other means. The step of determining whether the VAS 15 is reachable enhances the user's experience by bypassing unnecessary "failed to login" error messages common when a network connection can not be established. Once the credentials are authenticated by the VAS 15, the device 12 is permitted to join at least one collaboration session. When it is determined that the identified VAS 15 is reachable and communicatively coupled to the device 12, the VAS 15 requests the participant to supply login credentials to access at least one collaboration session via the device 12. These credentials may be the participant's Windows Active Directory user id and password, or network credentials, however, the credentials may be unique to the VAS 15, or may be specific to a particular collaboration session.

Alternatively, the application program automatically initiates a discovery process to find an available VAS 15, and the participant computing device 12 is assigned a network address (e.g., an IP address), including any other configuration settings, from the VAS 15, via any suitable transport protocol, such as UDP, TCP, TLS, HTTP(S), FTP, or TFTP, in order to auto-configure the device 12. Therefore, the participant computing device 12 is configured automatically without user intervention, and therefore can more easily access the resources of the collaboration system 10, such as videoconferencing resources or sharing resources via a network connection. Accordingly, the device 12 can be coupled to a display device associated with the system 10 or VAS 15, such as networked projector, via network 14, rather than through video cables.

After an initial successful login, the participant is given an option to permit the application program to store authenticated credentials to allow for automatic or transparent logins in subsequent collaboration sessions. Once logged in, a sharing application program is launched via an appropriate icon 42 in task bar 44. The desktop sharing application program may comprise an associated application window which may be minimized to free up GUI real estate or closed, while persisting in the background. In another example, the sharing application program is automatically launched upon a successful log in event.

Figure 4:
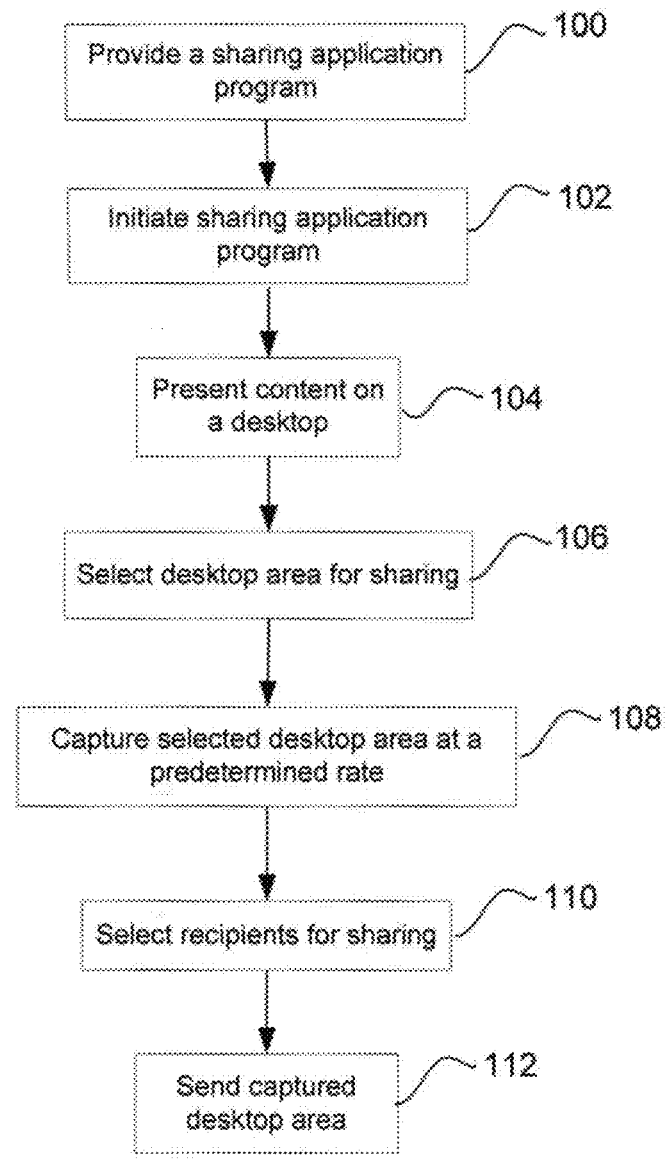
FIG. 4 is a flow chart diagram illustrating an exemplary collaboration method for sharing desktop content.

After all the devices 12 participating in the collaboration session are coupled to the VAS 15, each device 12 obtains a list of the other devices 12 in the collaboration session from the VAS 15. As shown in FIG. 3, a device 12 may share display data rendered on at least a portion of its display screen 40, e.g., a window, a region of the screen or the full screen, via the sharing application program. Looking at FIG. 4, a flow chart diagram illustrates an exemplary collaboration method for sharing desktop content. The method comprises the steps of providing a sharing application program to at least one participant computing device 12 in a collaboration system 10 (step 100); initiating the sharing application program (step 102); presenting content on a desktop associated with the at least one participant computing device 12 (step 104); selecting a desktop region having content intended for sharing (step 106); capturing the content in the selected desktop region (step 108); selecting at least one recipient from other participant computing devices 12 to receive the captured content (step 110); and transmit the captured content from the at least one participant computing device 12 to a network server 15 configured to distribute the captured content to the other participant computing devices 12 (step 112).

As an example, during an active video conferencing session, a user invokes a command to share at least one portion of the desktop 40, such as a double click action on icon 42 associated with the sharing application program. The command launches a dialog box 45 having a menu with available sharing options. The menu options may be grouped into categories and separated by an appropriate delimiter, such as a horizontal bar. The available sharing options may include, but are not limited to, "Desktop snapshot", "Partial desktop snapshot", and "Share desktop".

In one example, selecting the "Partial Desktop Snapshot" option creates a sharing window 46 bounded by a window frame 48 on the desktop 40. To enhance usability, the sharing window 46 may be substantially opaque to help the user distinguish between the desktop 40 and the windowed area 46 having said content for sharing. The sharing window 46 and window frame 48 may be moved to any location on the desktop 40 for data content 50 selection. The content 50 includes, but is not limited to, text, graphical images, documents, and multimedia. As an example, the window frame 48 may be moved by left clicking anywhere within the framed window 46, and dragging the framed window 46 to another location while pressing the left mouse button. The framed window 46 may be resized by left clicking appropriate resize bars, and dragging to an alternate size while pressing the left mouse button. The user can also expand the framed window 46 to full size by left clicking an appropriate expansion icon. Having determined the desired content 50 for sharing, the user overlays the suitably dimensioned framed window 46 over the desired content 50 for sharing, and elect to take a snapshot to capture the content 50. Such an action may include visual or audible indicators to confirm the capture event. As an example, the window frame 48 may include a momentary color change, such as a red window frame 48, and/or an audible camera shutter sound to confirm that an image of the framed window 46 has been captured. Alternatively, should the user decide not to capture the content 50, closing the framed window 46 cancels the selection.

Once the content 50 has been captured, another dialog box 52 with a plurality of options is presented on the display 40 prompting the user for further action. As an example, one of the options is for sending the captured content 50 to other participants in the collaboration session. Selection of this option causes a single image of the content 50 in window 46 to be captured and the captured content 50 is automatically sent to all participants via a messaging application integrated with the sharing application and VAS 15. As such, there is no requirement on the user's part to specify recipients. Alternatively, the user may select to capture and send a sequence of images. The images may be compressed using lossless or slightly lossy image compression techniques to reduce network bandwidth requirements and user-perceived delay while maintaining high image quality.

In another example, selecting the "Desktop Snapshot" option sends a single image of the user's entire desktop 40 to all participants. A momentary flash of a red border around the desktop 40, and/or an audible camera shutter sound may also be used confirm that an image of the desktop 40 has been captured. The image is subsequently sent to all participants automatically, without the user having to specify recipients.

In yet another example, the desktop 40 may be automatically captured periodically based on a user defined timer, or based upon changes to the user's desktop, and the captured images are also sent periodically in real-time. As such, processing structure 21 is caused to compare successive captured images of selected content 50 within the at least one region of the desktop 40 to determine whether there is a difference in the successive captured images. When the most recently captured image differs from a preceding image, in accordance with a predetermined criterion, then only the most recently captured image is sent for sharing, thus conserving bandwidth and processing resources. Using this option, a user may share a slide presentation, without having to manually capture and send each newly captured image. In this mode, a visual indicator may still be provided, however, the audio indicator may be muted, as the sound may distract the user, or interfere with the user's verbal presentation. Correspondingly, the visual indicator may be implemented in such a way that it fades in and out with each image capture, such that any captured images sent to the other participants do not include the visual indicator.

In the above examples, the captured images are processed by the device 12 and sent either to the VAS 15 for distribution, or sent directly to the other participants. The processing of the captured images may involve graphic manipulation of color depth, resolution and aspect ratio. To conserve bandwidth and reduce transmission time, the processed images may also be compressed, using lossy or lossless techniques, before being sent to their destination. However, some of the processing may be performed by the VAS 15 in the VAS distribution model.

In yet another example, after the image capture, the user or participant may be prompted to choose specific recipients or a distribution list, rather than sending the captured images to all collaboration session participants. The sharing application program presents a user interface that allows the participant to select session participants from a graphical rolodex that contains a scrollable list of user names or from a list of quick-dial buttons, or from a contact list associated with a messaging client, or from a directory.

The communication network 14 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Although in some of the embodiments described above, input to the system 10 is described primarily via the use of a mouse, those skilled in the art will appreciate that other input means for selection may be used, such as, pointers (pen tools, fingers) on appropriate touch displays.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. In a collaboration system, a method for sharing content displayed on a desktop associated with a participant computing device, said participant computing device having a processing structure; and a memory including instructions, wherein said memory and said instructions are configured, with said processing structure, to cause said processing structure to at least:
   in response to the participant computing device being first powered on and coupled to a network:
      prompt a participant to enter a network address of a network server configured to distribute said content to other participant computing devices;
      automatically determine whether the network server is reachable from said participant computing device;
      couple said participant computing device to said network server;
      when it is determined that the network server is reachable and coupled to the participant computing device, request the participant to supply login credentials to access at least one collaboration session via the participant computing device; and
      store authenticated credentials to allow for automatic or transparent logins in subsequent collaborative sessions; and wherein said memory and said instructions are further configured, with said processing structure, to cause said processing structure to at least:
   select said content on said desktop for sharing;
   capture said content; and
   automatically send said captured content to the network server for distribution to at least one of said other participant computing devices.

2. The method of claim 1 wherein said instructions cause said processing structure to provide a plurality of sharing options.

3. The method of claim 2 wherein one of said plurality of sharing options is for sharing an entire desktop.

4. The method of claim 2 wherein one of said plurality of sharing options is for capturing an entire desktop.

5. The method of claim 2 wherein one of said plurality of sharing options is for sharing a portion of said desktop.

6. The method of claim 5 wherein said instructions cause said processing structure to create a window on said desktop for selecting said content for sharing.

7. The method of claim 6 wherein said window is moveable for placement at different locations on said desktop.

8. The method of claim 7 wherein said window is scalable for placement at different locations on said desktop.

9. The method of claim 8 wherein said selected content within said window is captured at a predefined rate.

10. The method of claim 9 wherein said window comprises a frame, said frame having transformable attributes to indicate a capture event.

11. The method of claim 10 wherein said captured content within said window is automatically sent to said network server for distribution to said at least one of said other participant computing devices.

12. The method of claim 11 wherein said captured content within said window is automatically sent to said network server for distribution to a predefined list of said other participant computing devices.

13. The method of claim 11 wherein said captured content within said window is captured in real-time as a sequence of images and distributed in real-time.

14. A participant computing device having a machine-readable medium coded instructions executable by a processing structure, said coded instructions comprising:
   (a) a first set of instructions coded to, in response to the participant computing device being first powered on and coupled to a network, prompt a participant to enter a network address of the at least one application server and to automatically determine whether the network server is reachable from said participant computing device;

(b) a second set of instructions coded to, in response to the participant computing device being first powered on and coupled to a network, couple said participant computing device to said at least one application server;

(c) a third set of instructions coded to, in response to the participant computing device being first powered on and coupled to a network, and when it is determined that the network server is reachable and coupled to the participant computing device, request the participant to supply login credentials to access at least one collaboration session via the participant computing device, and to store authenticated credentials to allow for automatic or transparent logins in subsequent collaborative sessions;

(d) a fourth set of instructions coded to select content on a display of said participant computing device for sharing with other participant computing devices via said at least one application server;

whereby said selected content is captured for said sharing; and said coded instructions further comprising a fifth set of instructions coded to automatically send said captured content to said at least one application server for distribution to at least one of said other participant computing devices.

15. The participant computing device of claim 14 having coded instructions comprising a sixth set of instructions coded to send said selected content periodically, without further user intervention, to said at least one application server.

16. The participant computing device of claim 15 wherein said first set of instructions are coded to couple said participant computing device to a display device associated with said collaboration system via a network, wherein said display device comprises a network address.

17. A participant computing device in a collaboration system, said participant computing device comprising:
a processing structure; and
a memory including computer program code, wherein said memory and said computer program code are configured, with said processing structure, to cause said processing structure to share user defined content displayed on a desktop associated with the participant computing device with other participant computing devices by:
in response to the participant computing device being first powered on and coupled to a network:
prompting a participant to enter a network address of an application server configured to distribute said user defined content to the other participant computing devices;
coupling said participant computing device to said application server;
when it is determined that the network server is reachable and coupled to the participant computing device, requesting the participant to supply login credentials to access at least one collaboration session via the participant computing device; and
storing authenticated credentials to allow for automatic or transparent logins in subsequent collaborative sessions; and
selecting said user defined content on said desktop for sharing;
capturing said user defined content; and
automatically sending said captured user defined content to said application server for distribution to at least one of said other participant computing devices.

18. The participant computing device of claim 17 wherein said user defined content is confined to at least one region of said desktop.

19. The participant computing device of claim 18 wherein said processing structure is caused to capture only said user defined content within said at least one region of said desktop.

20. The participant computing device of claim 19 wherein said processing structure is caused to compare successive captured images of said user defined content within said at least one region of said desktop to determine whether there is a difference in said successive captured images, and to send a current image when said current image differs from a preceding image, in accordance with a predetermined criteria.

21. The participant computing device of claim 19 wherein said user defined content within said at least one region is captured at a rate based on a timer.

22. The participant computing device of claim 19 wherein said user defined content within said at least one region is captured in real-time and transmitted in real-time.

* * * * *